Figure 1:
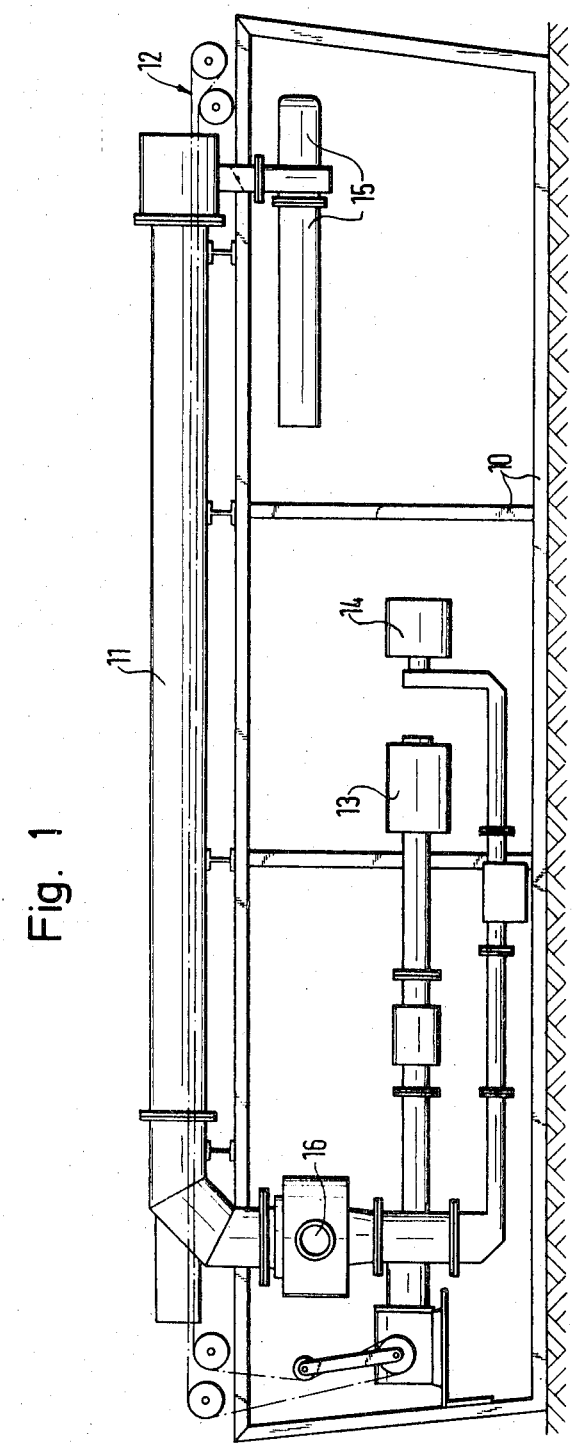

United States Patent [19]
Van Amsterdam

[11] 3,843,861
[45] Oct. 22, 1974

[54] WAVE GUIDE CHANNEL OPERATING WITH MICRO-WAVE ENERGY

[75] Inventor: Cornelis Johannes Maria Van Amsterdam, Viersen, Germany

[73] Assignee: Firma Johannes Menschner, Textilmaschinenfabrik, Dulken, Germany

[22] Filed: Aug. 3, 1973

[21] Appl. No.: 385,440

Related U.S. Application Data

[63] Continuation of Ser. No. 140,057, May 4, 1971, abandoned.

[52] U.S. Cl. ............................ 219/10.55, 333/95 R
[51] Int. Cl. ................................................ H05b 9/06
[58] Field of Search ............ 333/95, 95 R; 219/10.55

[56] References Cited
UNITED STATES PATENTS

| | | | |
|---|---|---|---|
| 3,461,261 | 8/1969 | Lewis et al. | 219/10.55 |
| 3,551,199 | 12/1970 | Forster | 219/10.55 |
| 3,594,530 | 7/1971 | Wiegmann | 219/10.55 |

*Primary Examiner*—J. V. Truhe
*Assistant Examiner*—Hugh D. Jaeger
*Attorney, Agent, or Firm*—Ernest G. Montague; Karl F. Ross; Herbert Dubno

[57] ABSTRACT

An apparatus for the treatment of thermally treatable goods, such as extruded, long-stringed profiles of rubber or synthetic material, which are guided in a continuous passage under the effect of microwave energy by a microwave-waveguide-channel, comprising a microwave-waveguide-channel designed as a ridge channel and operating with a low limit frequency for the vulcanization for an intensive thermo-treatment of extended profiles of rubber or synthetic material having a large cross-section.

5 Claims, 6 Drawing Figures

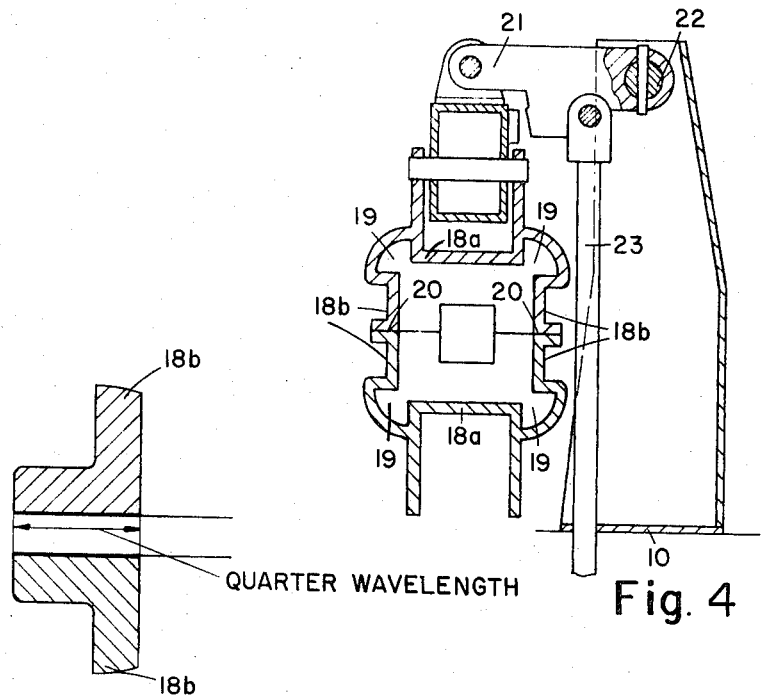
Fig. 4
QUARTER WAVELENGTH
Fig. 6
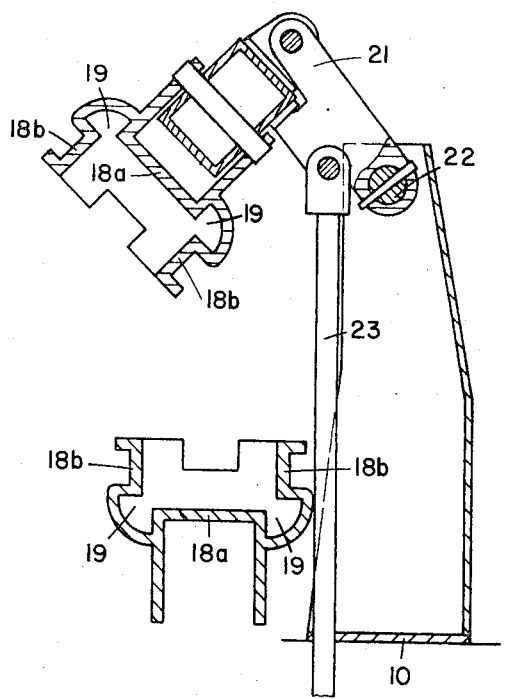
Fig. 5

WAVE GUIDE CHANNEL OPERATING WITH MICRO-WAVE ENERGY

This is a continuation application of the U.S. Pat. application Ser. No. 140,057, filed May 4, 1971 now abandoned.

The present invention relates to an apparatus for the heat treatment of material, in particular of extruded profiles of rubber or synthetic material in longitudinal strands, which are guided in a continuous passage under the effect of microwave energy by a microwave waveguide channel.

In the practice of the thermal treatment of profiles of rubber or synthetic material there exit, due to the inferior heat-conducting capacity of rubber or synthetic material, appreciable difficulties, because the heat effective on the outside must be brought to the inside of the material. The heat transportation to the core of the material takes place only very slowly.

In recognition of these difficulties, microwave energy has been used to make possible a uniform heating of the profile.

In spite of the fact that for this purpose in practice, both conventional rectangular waveguides operating in a $H_{10}$-mode and conventional circular waveguides operating in a $E_{01}$-mode can be used within certain limits only due to the inherent both only used due to the lawful build-up of the electric field distribution therein, it has been shown, that upon vulcanization or netting of profiles of rubber or synthetic material, already partly satisfactory results can be obtained with a circular waveguide operating in a $E_{01}$-mode, if the profile to be treated does not surpass a predetermined cross-sectional volume. In such a circular waveguide only profiles only up to a limited total diameter of for example 30mm can be vulcanized or netted, without appreciably disturbing the reduction of the electrical field towards the edge.

Since, however, in practice an urgent requirement exists, to be to apply vulcanization and netting treatments to rubber-or synthetic material profiles of a size surpassing the previously mentioned cross-section size, whereby it relates to profiles of a cross-section of about 50 × 50 mm or more, the known treating methods by far do not suffice.

It is for this reason one object of the present invention is to provide a waveguide ridge operating with microwave energy, an arrangement of the type set forth in the preamble that is more suitable for reliably treating rubber or synthetic material profiles having relatively large cross-sections.

It is a further object of the present invention to provide an arrangement for heat treatment by means of microwave energy that can be realized in a way permitting easy operation and convenient access to the interior of the waveguide channel.

The above objects are achieved by an arrangement for heat treatment of materials which comprises a waveguide channel including a boundary wall, a source of microwave energy, and means for coupling microwave energy to the waveguide channel. Means are also provided for passing matter through the waveguide channel. The waveguide channel further comprises electrically conductive means forming an integral part of the boundary wall of the waveguide channel projecting from the wall into the interior of the waveguide channel and extending throughout the length thereof for concentrating the microwave energy substantially uniformly upon the matter throughout the length of the waveguide channel.

The proposed use of ridge wave guides is favorable insofar as being advantageous, because such ridge wave guides have the characteristic, limit frequency is strongly reduced and the wave length in the wave guide comes close to the wave length in free space, resulting in, that between the projecting portions of the boundary wall, an appreciably more uniform field distribution is brought about. Thus providing a more uniform heating of the profiles to be treated over its entire cross-section.

In a first embodiment of the present arrangement, the waveguide channel is of a substantially rectangular cross-section having broad and small faces and the means projecting into the interior form an integral part of these broad faces, said means being disposed centrally and symmetrically with respect to the center line of these broad faces. The profile to be treated is passed through the waveguide channel in the region between the projecting portions of the boundary wall.

In a second embodiment of the present arrangement, the waveguide channel is of a substantially square cross-section and the means projecting into the interior form an integral part of both pairs of opposite waveguide channel faces. In this embodiment two electrical fields operating independently from each other are built up crosswise between the two pairs of opposite waveguide channel faces, each electrical field being produced by its own microwave generator. Owing to the fact that in the region between the projecting portions of the boundary walls the two electrical fields overlap and cross one another, a very effective and uniform heating in that region is assured. Accordingly, the structural length of the arrangement can be made shorter than in said first embodiment. In this second embodiment it is advantageous to provide the waveguide channel with quarter wavelength means for decoupling the two electrical fields, said decoupling means being disposed at each junction of adjacent waveguide channel faces. By this measure spark formation or undesired interaction between the two electrical fields are avoided, since the short circuit at the closed end of this quarter wavelength means is transformed into a very high impedance at their open end, thus reducing the danger of undesired interaction to a minimum.

In a preferred embodiment, the waveguide channel comprises upper and lower half-waveguide structures mounted to be seperable with respect to each other, which half-waveguide structures can be coupled to each other so as to form the waveguide channel by means of quarter wavelength choke couplings. In this preferred embodiment, the arrangement is easy to operate and a convenient access to the waveguide channel is provided, while nevertheless leaking of microwave energy is avoided owing to the sealing action of the quarter wavelength choke couplings.

With these and other objects in view, which will become apparent in the following detailed description, the present invention will be clearly understood in connection with the accompanying drawings, in which:

FIG. 1 is a side-elevational view of an arrangement according to the invention

Figure 2:
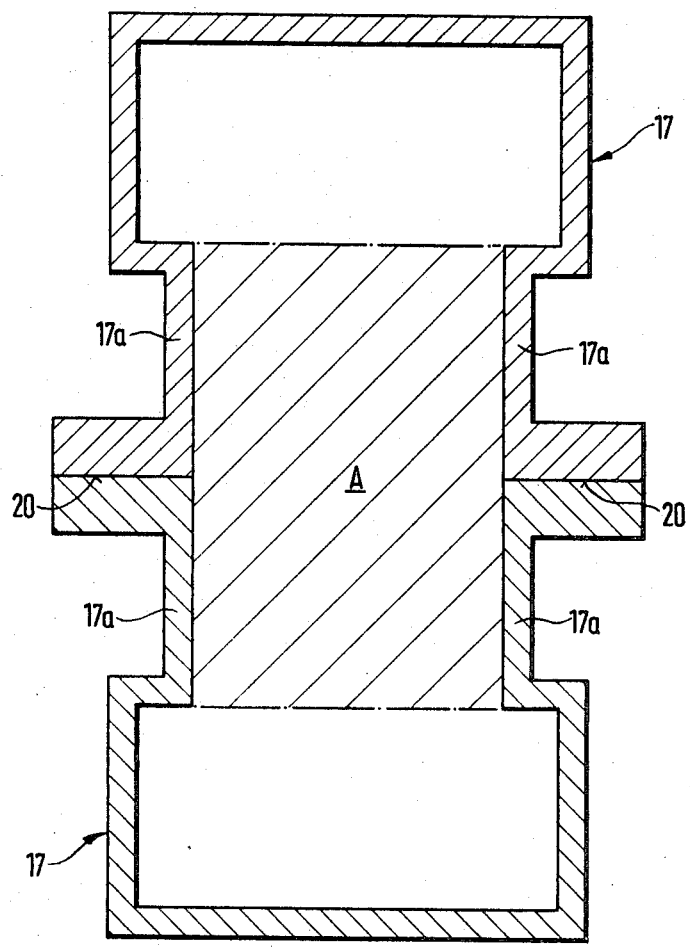
Figure 3:
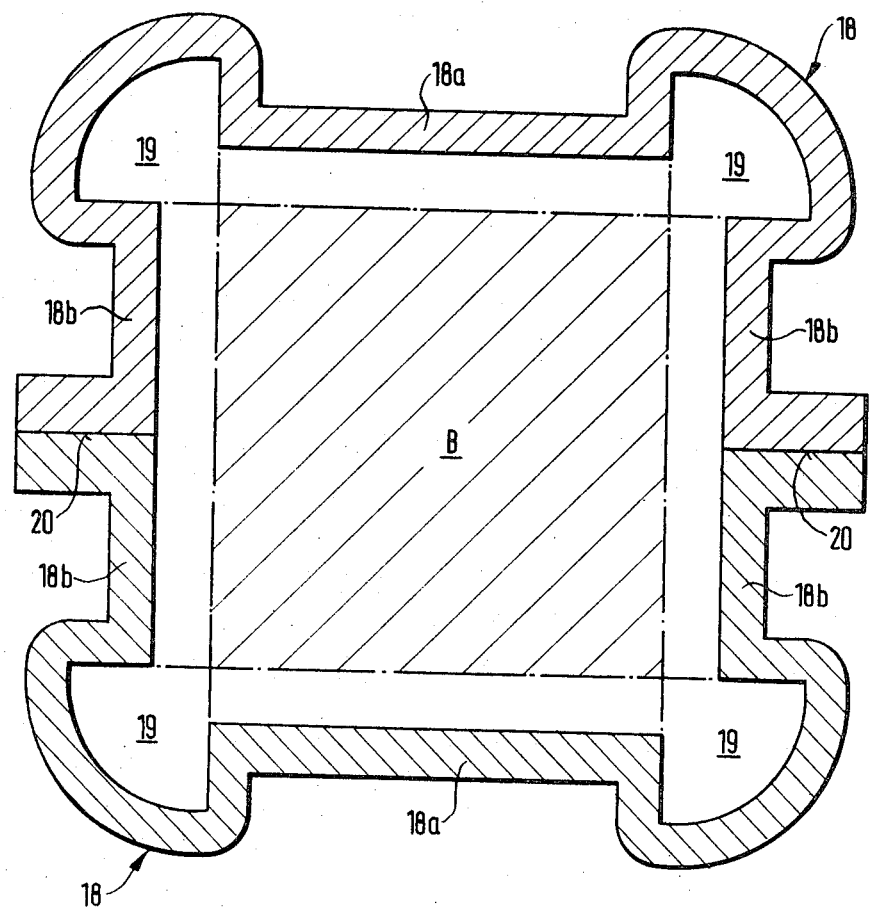

FIG. 2 a cross-sectional view of a first type of waveguide channel suitable for use in the arrangement of FIG. 1, FIG. 3 is a cross-sectional view of a second type of waveguide channel suitable for use in the arrangement of FIG. 1, FIGS. 4 and 5 are cross-sectional views of a preferred embodiment of the arrangement of the invention showing the waveguide channel in its closed and open state, respectively.

FIG. 6 shows a magnified view of a quarter wavelength coupling as used in the embodiments of FIG. 4 and FIG. 5.

In the FIGS. 1 – 6 like references denote like parts.

Referring to FIG. 1, there is shown arrangement on a machine frame 10 on which a wave guide channel is mounted, at one end an inlet-opening and at the opposite end an outlet-opening. In the longitudinal direction the channel 11 is passed by a transportation device 12 on which the material (not shown) to be treated is to be conveyed. Further-more in the machine frame there are disposed two magnetrons 13 and 14 operating as a source of microwave energy. In addition a hot air producing device 15 is arranged as shown, to force additional air into the channel 11. On the side remote from the air input side the used air is removed again at the exhaust element 16.

In order that in such wave guide channel 11 also large cross-sectional profiles can be treated efficiently, the wageguide channel 11 has a cross section as shown in FIG. 2.

This cross-section is substantially rectangular.

On its broad faces there are provided means 17a projecting into the interior of the waveguide and forming an integral part of these broad faces. As will be apparent from FIG. 2, these means 17a are disposed centrally and symmetrically with respect to the centerline of these broad faces. By the projecting portions 17a of the boundary wall 17a practically uniform electrical field is obtained which is concentrated substantially in the hatched region indicated at A. Another possible cross-section of the waveguide channel 11 in FIG. 1 is shown in FIG. 3. This cross-section is substantially square. On both pairs of opposite waveguide channel faces these are provided means 18a and 18b respectively projecting into the interior of the waveguide channel. Between the projecting portions 18a a first electrical field is built up, while between the projecting portions 18b a second electrical field is built up independently from said first electrical field.

Owing to the fact that in the hatched region indicated at B between each pair of projecting portions 18a and 18b of the boundary wall 18, the two electrical fields overlap and cross one another, the material to be treated is subjected to two substantially uniform and concentrated independent fields. The independency of these two fields is further enhanced by quarter wavelength means 19 disposed at the functions of adjacent waveguide channel faces and effecting decoupling of said first and second electrical fields throughout the length of the waveguide channel.

Referring to FIG. 4 and FIG. 5 which show cross-sectional views of a preferred embodiment, the waveguide channel cross-section is as shown in FIG. 3. In this preferred embodiment, however, the waveguide channel is composed of a lower half-waveguide structure and an upper half-waveguide structure which are separatable from one another to obtain easy access to the interior throughout the length of the waveguide channel.

To this end the lower half-waveguide structure of the waveguide channel is fixedly mounted on the frame 10 whereas the upper half-waveguide structure of the waveguide channel is connected to one end of a lever arm 21 the other end of which is rotatably mounted on a pivot axes 22. The pivot axes is welded to an upright portion of frame 10. The lever arm 21 may be pushed in the upward direction by means of a rod 23 to rotate about the pivot axes 22 thereby tilting the upper half-waveguide structure of the waveguide channel away from the lower half-waveguide structure as illustrated in FIG. 5.

In order to prevent microwave energy from leaking through at the region 20 during the normal operating condition, the upper and lower half-waveguide structures of the waveguide channel are coupled to each other by means of quarter wavelength choke couplings as shown on an enlarged scale in FIG. 6.

It is to be understood that the illustrated and described embodiments are to be considered only as examples for the practical realization of the present invention, which is, however, not limited thereto. It would be possible, to realize also a deviating cross-sectional form of the wave guides, as long as the advantages of the uniform treatment of the treatment goods are maintained.

While I have disclosed several embodiments of the present invention, it is to be understood that these embodiments are given by example only and not in a limiting sense.

I claim:

1. An arrangement for heat treatment of material, comprising
   a waveguide channel including a boundary wall,
   a source of microwave energy,
   means for applying the microwave energy to said waveguide channel, and
   means for passing said material through said waveguide channel,
   said waveguide channel further comprising
   electrically conductive means forming an integral part of said boundary wall of said waveguide channel, projecting from said wall into the interior of said waveguide channel and extending throughout the length thereof for concentrating the microwave energy substantially uniformly upon said material throughout the length of said waveguide channel.

2. The arrangement, as set forth in claim 1, wherein said waveguide channel is of a substantially rectangular cross-section having broad and small faces, and wherein
   the said means projecting into the interior of said waveguide channel form an integral part of said broad faces, and
   said means being disposed centrally and symmetrically with respect to the center line of said broad faces.

3. The arrangement, as set forth in claim 1, wherein said waveguide channel is of a substantially square cross-section;

said means projecting into the interior of said waveguide channel form an integral part of both pairs of opposite waveguide channel faces, said means being disposed centrally and symmetrically with respect to the center lines of said faces;

said means for applying said microwave energy to said waveguide channel are arranged to produce a first electrical field between a first pair of opposite waveguide channel faces and a second electrical field between the second pair of opposite waveguide channel faces.

4. The arrangement, as set forth in claim 3, wherein said waveguide channel further comprises quarter wavelength means for decoupling said first and second electrical fields throughout the length of said waveguide channel, and said decoupling means are disposed at each junction of adjacent waveguide channel faces.

5. The arrangement as set forth in claim 1, wherein said waveguide channel comprises upper and lower half-waveguide structures mounted to the separatable from each other and means for coupling said upper and lower half-waveguide structures to each other, so as to form said waveguide channel, and said coupling means being a quarter wavelength choke coupling.

* * * * *